United States Patent
Mutschler

(10) Patent No.: US 10,900,437 B2
(45) Date of Patent: Jan. 26, 2021

(54) DRIVE CONTROL ARRANGEMENT FOR A MOBILE WORKING MACHINE AND INTERFACE

(71) Applicant: Robert Bosch GmbH, Stuttgart (DE)

(72) Inventor: Steffen Mutschler, Neu-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/514,082

(22) Filed: Jul. 17, 2019

(65) Prior Publication Data

US 2020/0025124 A1    Jan. 23, 2020

(30) Foreign Application Priority Data

Jul. 17, 2018  (DE) .................. 10 2018 211 842
Jun. 7, 2019   (DE) .................. 10 2019 208 319

(51) Int. Cl.
```
F02D 41/38    (2006.01)
B60W 10/06    (2006.01)
B60W 40/09    (2012.01)
B60W 40/12    (2012.01)
G05B 19/042   (2006.01)
```

(52) U.S. Cl.
CPC ......... *F02D 41/3827* (2013.01); *B60W 10/06* (2013.01); *B60W 40/09* (2013.01); *B60W 40/12* (2013.01); *G05B 19/042* (2013.01)

(58) Field of Classification Search
CPC ............. F02D 41/3827; F02D 2250/22; F02D 2250/24; B60W 10/06; B60W 40/09; B60W 40/12; G05B 19/042
See application file for complete search history.

(56) References Cited

U.S. PATENT DOCUMENTS

| | | | |
|---|---|---|---|
| 2011/0126533 A1* | 6/2011 | Noll ................. | F16H 61/47 60/431 |
| 2011/0295433 A1* | 12/2011 | Evans ................. | B60W 20/10 700/282 |
| 2012/0100956 A1* | 4/2012 | Mattsson ............ | B60W 10/06 477/3 |
| 2015/0315767 A1* | 11/2015 | Miyamoto .......... | E02F 9/2091 701/50 |

FOREIGN PATENT DOCUMENTS

DE    10 2013 214 732 A1    2/2015

* cited by examiner

*Primary Examiner* — George C Jin
(74) *Attorney, Agent, or Firm* — Maginot, Moore & Beck LLP

(57) ABSTRACT

A drive control arrangement, for driving of consumers of a mobile working machine with a Diesel engine, includes a Diesel engine controller, vehicle controller, and interface. The engine controller is configured to actuate the Diesel engine via a first control signal. The vehicle controller is configured to (i) control the consumers via at least one second control signal, (ii) transfer a power demand, via the interface, to the engine controller, and (iii) receive feedback, via the interface, with reference to an available power from the Diesel engine. The interface is configured such that the power demand includes a value for a mechanical power and at least one speed interval value. When the engine is delivering a power according to the value of the power demand and/or with reference to the feedback, the engine controller is further configured to control a speed of the engine in a speed interval with reference to the at least one speed interval value.

13 Claims, 1 Drawing Sheet

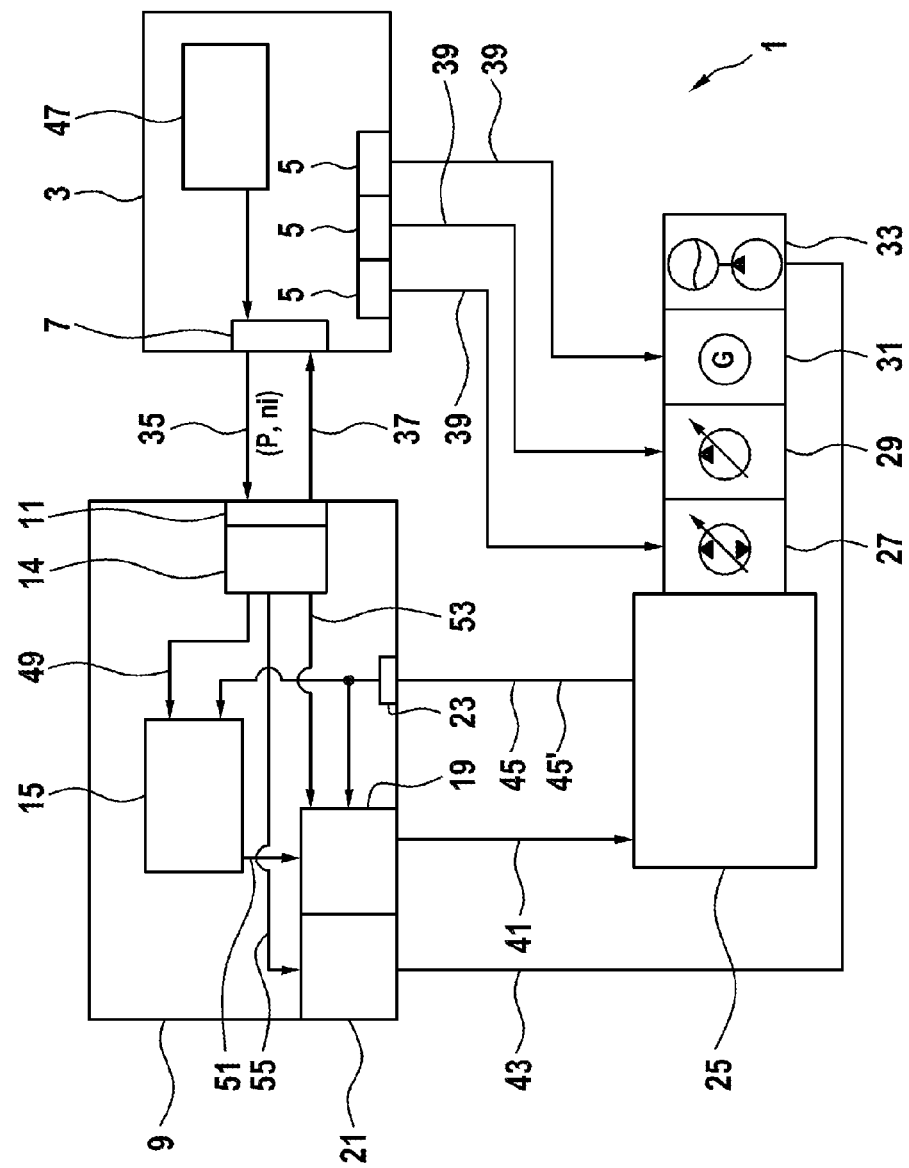

DRIVE CONTROL ARRANGEMENT FOR A MOBILE WORKING MACHINE AND INTERFACE

This application claims priority under 35 U.S.C. § 119 to patent application no. DE 10 2018 211 842.6, filed on Jul. 17, 2018 in Germany, and to patent application no. DE 10 2019 208 319.5, filed on Jun. 9, 2019, the disclosure of which is incorporated herein by reference in its entirety.

The present disclosure relates to a drive control arrangement for a mobile working machine, having a vehicle controller for the control of the consumers of the mobile working machine and having a Diesel engine controller for actuating the Diesel engine of the mobile working machine. Furthermore, the present disclosure relates to an interface at a vehicle controller or an interface at a Diesel engine controller.

BACKGROUND

Such drive control arrangements and interfaces are known in principle. In one solution specified by the applicant in the German patent application DE 10 2013 214 732 A1a vehicle controller calculates the overall power demand of the vehicle based on all available power demands for the consumers (for driving, for operations) in accordance with the driver's wishes. An overall energy coordinator is organized in the control structure of the vehicle, which among other things assigns the power to be provided to the Diesel engine and optionally also a speed to be maintained. Accordingly, e.g., an interface with the Diesel engine can indicate a target torque and a target speed.

However, this approach seems to be quite limiting.

SUMMARY

Therefore, the problem which the present disclosure proposes to solve is to create a drive control arrangement for a mobile working machine and to indicate interfaces at a vehicle controller or a Diesel engine controller which in particular allow the Diesel engine controller to actuate the Diesel engine with favorable fuel consumption.

This problem is solved by the drive control arrangement according to the disclosure or by interfaces according to the disclosure at a vehicle controller or at a Diesel engine controller.

The drive control arrangement according to the disclosure comprises a Diesel engine controller for actuating the Diesel engine of the mobile working machine with a first control signal and a vehicle controller for controlling the consumers with at least one second control signal. The two controllers are connected via an interface, by which the vehicle controller can transfer a power demand of the consumers to the Diesel engine controller and by which the Diesel engine controller can send feedback as to an available power to the vehicle controller.

According to the disclosure, the interface is designed such that the power demand comprises, besides a value for a mechanical power, also at least one speed interval value. The Diesel engine controller is designed to control a speed of the Diesel engine in a speed interval with the help of the at least one speed interval value while the Diesel engine is delivering a power according to the value of the power demand and/or according to the feedback as to the available power.

According to this solution, a speed which is optimal for fuel consumption can now be preselected in the Diesel engine controller—in which a multitude of parameters of the Diesel engine are present, allowing the Diesel engine to be controlled with favorable fuel consumption. Thus, there is a certain freedom in terms of the speed for the Diesel engine or the Diesel engine controller, namely, the speed itself can be set optimally in a particular interval. Thus, the Diesel engine can deliver the power demanded by the vehicle controller and also usually a desired speed with low fuel consumption and quiet engine running—for example, with the aid of the characteristics of its charging, a measured air mass, an air reserve or power reserve determined from the current injection rate and the measured air mass, the accordingly available torque or an acceleration reserve. The desired speed may be a stationary minimum speed of the hydraulic consumers. Stationary here means that this speed may drop further in dynamic loading situations. But it is also conceivable to indicate an absolute minimum speed for especially speed-sensitive consumers which cannot be dropped below.

An interface according to the disclosure at a vehicle controller or a Diesel engine controller can be designed in particular as a data communication interface, for example as an interface of a serial CAN-BUS. But other data buses are also conceivable. As noted, besides a value for a mechanical power according to the disclosure at least one speed interval value is now also established and transmitted by data techniques.

By assigning the Diesel engine controller a speed interval, on the one hand the above-mentioned benefits of fuel consumption and quiet running can be achieved, and on the other hand the control behavior of the Diesel engine controller becomes more transparent and predictable from the standpoint of the vehicle controller, since a maintaining of the indicated speed interval is expected and can also be implemented.

Further advantageous embodiments of the present disclosure are the subject matter of the FIGURE, the Detailed Description, and the claims.

As mentioned, a first speed interval value can indicate a desired speed and a second speed interval value can indicate a minimum speed not to be fallen below. Thus, an interval of permissible speed values is organized for the Diesel engine control, within which a speed optimization is possible. In addition, a necessary minimum speed is guaranteed for the consumers.

In addition, a maximum speed can still be ascertained and transmitted by the vehicle controller, or a maximum speed can be stored in the Diesel engine controller as a preselection value, so that an upper limit is also dictated for the speed interval, and thus the Diesel engine and the consumers—such as hydraulic axial piston pumps—are protected.

But it may also be advantageous to transmit only a desired speed, while a calculation rule is known each time by the Diesel engine controller and especially also by the vehicle controller, by which the Diesel engine controller ascertains a speed interval from the desired speed. Now, if the vehicle controller has demands from the consumers for a minimum speed to be observed at least, the desired speed which is relayed can be ascertained by means of the known calculation rule so that the minimum speed is observed.

Preferably, there is present in the Diesel engine controller a speed trajectory controller, which receives a desired speed and at least the minimum speed via the mentioned interface or via a processing unit, wherein the speed trajectory controller forms the first control signal from this information about the speed interval in order to regulate the actual speed of the Diesel engine to the desired speed. Advantageously, the speed trajectory controller is further designed to let the actual speed of the Diesel engine drop to at most the minimum speed upon rise in the power demand of the mechanical power. Hence, the fuel consumption can be optimized by taking advantage of the interval.

In addition, an air mass actual value may be used to form the first control signal, in order to further optimize the speed control in the Diesel engine controller.

A hydraulic or electric accumulator could also be incorporated in this system and be actuated by the Diesel engine controller or some other way, in order to profit from the benefits of a hybrid solution.

BRIEF DESCRIPTION OF THE DRAWINGS

The present disclosure shall now be described more closely with reference to the FIGURE.

The sole FIGURE shows a drive control arrangement of a mobile working machine according to the disclosure as an exemplary embodiment of the disclosure.

DETAILED DESCRIPTION

According to the FIGURE, the drive control arrangement of a mobile working machine 1 comprises a vehicle controller 3 for actuating a plurality of consumers of the mobile working machine. These consumers are, for example, a traction drive 27, represented by the traction drive pump, operating hydraulics 29, represented by the pump of the operating hydraulics, and an electric generator 31.

All of these consumers 27, 29, 31 are coupled to the output shaft—or engine shaft—of the Diesel engine 25 and are driven by it. The consumers are actuated by the vehicle controller 3 with second control signals 39 across control signal outputs 5.

In the vehicle controller 3, in addition to the mechanical power P needed for the consumers—in relation to the engine shaft—there is also ascertained an optimal or stationary required speed for the operation of the consumers by a speed preselection unit 47. There may also be ascertained a speed interval, or a currently required absolute minimum speed not to be dropped below for the operation of at least one of the consumers, an optimal or stationary necessary speed, and possibly a maximum speed.

The speed interval values and the power demand P are put out at the interface 7 of the vehicle controller 3 and transmitted as a data record 35 to a corresponding interface 11 of a Diesel engine controller 9. Both interfaces 7 and 11 are connected via a bus system. A vehicle CAN bus, for example, is suitable for this. The Diesel engine controller 9 returns across the same interface 11 and 7 a power feedback 37, which communicates to the vehicle controller 3 the maximum power to be called up by the consumers.

The Diesel engine controller 9 has, in addition to the interface 11, an input 23 for actual values of the Diesel engine, such as a Diesel motor speed actual value 45 and an air mass actual value 45'. Furthermore, it has a control 19 for an injection rate, by which a control signal of the injection rate 41—also known as the first control signal—is put out to a fuel injection system of the Diesel engine 25. Moreover, there may be a control 21 for a storage module 33. The storage module 33, likewise flanged onto the engine shaft, is controlled by the control 21 via the stored power control signal 43.

A merely exemplary embodiment of the Diesel engine controller 9 may appear as follows. The interface 11 is connected to a processing unit 14. Furthermore, there is present a speed trajectory controller 15. The processing unit 14 actuates the speed trajectory controller 15 with preselection values 49, which dictate the speed interval in which the speed of the Diesel engine 15 can be controlled.

Furthermore, the processing unit 14 receives the power demand P of the vehicle controller 3. From the power demand P, the processing unit 14 ascertains a Diesel engine power value 53, with which the injection rate control 19 can be precontrolled. Furthermore, a stored power value 55 may optionally be ascertained, with which a storage control 21 is actuated, so that the demanded power P is divided between the Diesel engine 25 and the optionally present storage 33. If the power which can be produced by the Diesel engine 25 in its current state and possibly a power which the storage 33 can provide are not enough to meet the power demand P, the value of a currently maximum provided power is then returned as a power feedback 37 to the vehicle controller 3. In this case, the vehicle controller 3 prioritizes the power sharing among the consumers 27, 29 and 31.

The actual values of the speed 45 and the air mass 45' measured at the engine are sent on the one hand to the injection rate control 19. The speed 45 is furthermore sent to the speed trajectory controller 15. The speed trajectory controller 15 can furthermore also obtain the actual value of the air mass 45', in order to estimate an available power reserve of the Diesel engine 25 and thereby further optimize the speed regulation.

The speed trajectory controller 15 may also be assigned a dynamic power reserve for a speed increase. This dynamic power reserve is available for increasing the Diesel speed when the power demanded by the vehicle controller 3 is higher than the maximum available engine power for the current speed. The Diesel engine controller 9 then reports as the available power 37 the maximum available engine power minus the dynamic power reserve in order to make possible an increasing of the speed. Thus, the speed trajectory controller 15 is designed to influence the control signal 41 or 51 for the injection rate in the sense of a speed increase when the available power reserve of the Diesel engine is equal to or less than the value of the dynamic power reserve.

If the dynamic power reserve has a large value, the speed will be quickly increased and the available power 37 will be accordingly heavily limited during this process. Thus, the target power is quickly available. On the other hand, for a lesser dynamic power reserve, the speed will be increased only slowly, but more power 37 is available for the consumers. A large dynamic power reserve results in good response behavior and overall a somewhat increased speed level; a low dynamic power reserve results in less fuel consumption.

The dynamic power reserve may be stored in the Diesel engine controller 9 as a given value. But the dynamic power reserve can also be relayed as an additional parameter via the interfaces 7 and 11 from the vehicle controller 3 to the Diesel engine controller 9 as a target value. In this way, the dynamic power reserve can be adapted by the vehicle controller 3 to a driving situation or working situation.

With the aid of the preselection values 49 for the speed interval, the actual speed 45 of the Diesel engine 25 and possibly the actual value of the air mass 45', the speed trajectory controller 15 ascertains a speed trajectory, and based on this a speed control deviation and a control value 51, also known as a Diesel control signal 51, which is presented to the injection rate control 19 for the influencing of the injection rate of the Diesel engine 25.

The following possibilities exist for setting the speed interval for actuation of the speed trajectory controller 15 in the Diesel engine controller 9:

a) The vehicle controller 3 ascertains the power demand P of the consumers, it ascertains an optimal or stationary required speed for the consumers 27, 29, 31—i.e., the desired speed $n_W$—and it ascertains a minimum speed $n_{Min}$, which is absolutely needed by at least one of the consumers in order to perform its work task. Furthermore, a maximum speed $n_{Max}$ may also be determined or permanently set, which the consumers may not exceed. The vehicle controller 3 relays the power P, and as speed interval values ni the desired speed $n_W$, and the minimum speed $n_{Min}$, and possibly also the maximum speed $n_{Max}$ via the interfaces 7 and 11 to the Diesel engine controller 9. In the Diesel engine controller 9, the speed trajectory controller 15 is actuated with the help of the speed interval organized from the desired speed $n_W$, the minimum speed $n_{Min}$, and possibly also the maximum speed $n_{Max}$. The maximum speed may also be parametrized in the Diesel engine controller 9, and then need not be relayed by interface.

b) The vehicle controller 3 ascertains as per the above the power demand P of the consumers, it ascertains an optimal, stationary required desired speed $n_W$ for the consumers 27, 29, 31 and it ascertains a minimum speed $n_{Min}$, which is needed by at least one of the consumers in order to perform its work task. Furthermore, a maximum speed $n_{Max}$ may also be determined or permanently set, which the consumers may not exceed. The vehicle controller 3 relays the power P, and as the speed interval value ni only a desired speed $n_{W*}$.

The desired speed $n_{W*}$ here has been ascertained with a calculation rule, which is stored both in the vehicle controller 3 and in the Diesel engine controller 9, from at least the optimal desired speed $n_W$ and the minimum speed $n_{Min}$. The Diesel engine controller 9 uses the relayed desired speed $n_{W*}$ as the desired speed of the vehicle controller 3 and calculates by the same calculation rule the minimum speed $n_{Min}$, which thereby agrees with the minimum speed $n_{Min}$ ascertained by the vehicle controller 3.

If the calculation rule e.g. calls for the minimum speed $n_{Min}$ to have a distance $n_A$ from the desired speed, thus the Diesel engine controller 9 calculates: $n_{Min} = n_{W*} - n_A$, the vehicle controller 3 first calculates: $n_{W*} = n_{Min} + n_A$ and relays the value $n_{W*}$ so calculated if this is larger than $n_W$. Otherwise, $n_{W*} = n_W$ can be relayed.

With the interval from the relayed desired speed $n_{W*}$ and the calculated minimum speed $n_{Min}$, possibly supplemented with a given maximum speed $n_{Max}$, the Diesel engine controller 9 actuates the speed trajectory controller 15.

A consumption-optimized mobile working machine can be constituted with the drive control arrangement according to the disclosure for a mobile working machine, i.e., with at least a vehicle controller 3 and a Diesel engine controller 9 and the previously described interface between these two devices, at which values ni for a speed interval are relayed in addition to the demanded power P.

The vehicle controller 3 thus calculates the overall power demand of the vehicle based on all power demands coming from the driver. The Diesel engine controller 9 itself calculates the optimal speed trajectory with the speed trajectory controller 15 and the required injection rate in order to optimally present the demanded power P.

Besides the properties of the Diesel engine 25, parameters are also taken into account such as the flywheel mass and any connected parallel hybrid systems (hydraulic accumulator or electrical hybrid systems). At the same time, it is reported back to the vehicle controller 3 how much power should actually be called up, because the power request P from the vehicle controller may be dynamically significantly higher than the available Diesel engine power. The vehicle controller 3 shares any lesser available power among the consumers according to a prioritization rule.

Besides the demanded power, the vehicle controller 3 demands a stationary minimum speed from the Diesel engine controller 9. Thus, the vehicle controller 3 can ensure that a desired task (driving, operating) can be performed with the necessary velocity. Stationary means that this speed is to be reached and maintained in a steady state of the vehicle. It is permissible for the Diesel engine to be depressed during a load change, i.e., the speed may drop significantly below the target speed under load, in order to utilize the kinetic energy of the flywheel mass—i.e., the engine shaft with attached pump engines of the consumers, clutches, rotors, etc. The optimal depression can be determined in the drive control arrangement of the disclosure by the Diesel engine controller 9 itself, based on a calculated speed trajectory or one represented with the aid of control parameters. Of course, conditions may be factored in which ensure an optimal low fuel consumption.

Usually the Diesel engine controller 9 prevents the speed of the Diesel engine 25 from dropping below a certain value. For especially speed-sensitive applications, however, the vehicle controller also has the ability to dictate a minimum speed which may not be dropped below. This is then treated by the Diesel engine controller 9, as described above, as a lower limit value of the speed interval in the trajectory planning.

A drive control arrangement according to the disclosure, for the driving of consumers of a mobile working machine with a Diesel engine, comprises a Diesel engine controller for actuating the Diesel engine of the mobile working machine with a first control signal, and a vehicle controller for controlling the consumers with at least one second control signal. The drive control arrangement further has an interface by which the vehicle controller transfers a power demand of the consumers to the Diesel engine controller and by which the vehicle controller receives feedback as to an available power from the Diesel engine controller.

Advantageously, the interface is designed such that the power demand comprises, besides a value for a mechanical power, also at least one speed interval value; and the Diesel engine controller is designed to control a speed of the Diesel engine in a speed interval with the help of the at least one speed interval value while the Diesel engine is delivering a power according to the value of the power demand and/or according to the feedback as to the available power.

REFERENCE SYMBOLS

1 Drive control arrangement of a mobile working machine
3 Vehicle controller
5 Control signal outputs
7 Interface
9 Diesel engine controller
11 Interface
14 Processing unit
15 Speed trajectory controller
19 Injection rate control
21 Storage module control
23 Diesel speed and air mass interface
25 Diesel engine
27 Traction drive consumer
29 Operating hydraulics consumer
31 Generator consumer
33 Storage module
35 Power demand and speed interval setting, data record
37 Power feedback 39 Consumer control signals, second control signal
41 Injection rate control signal, first control signal
43 Stored power control signal
45 Diesel speed actual value
45' Air mass actual value
47 Speed interval preselection unit
49 Speed interval preselection value
51 Diesel control signal
53 Diesel engine power value
55 Stored power value

What is claimed is:

1. A drive control arrangement for driving consumers of a mobile working machine via a Diesel engine, the drive control arrangement comprising:
an interface;
a Diesel engine controller configured to actuate the Diesel engine via a first control signal; and
a vehicle controller configured to:
control the consumers via at least one second control signal;
transfer, via the interface, a power demand of the consumers to the Diesel engine; and
receive, via the interface, feedback from the Diesel engine controller with reference to an available power;
wherein the interface is configured such that the power demand includes a value for a mechanical power and at least one speed interval value;
wherein, when the Diesel engine is delivering a power corresponding to one or more of the value for the mechanical power and the feedback with reference to the available power, the Diesel engine controller is further configured to control a speed of the Diesel engine in a speed interval with reference to the at least one speed interval value.

2. The drive control arrangement of claim 1, wherein the interface is further configured such that a first speed interval value of the interface is indicative of a desired speed, and such that a second speed interval value of the interface is indicative of a minimum speed.

3. The drive control arrangement of claim 2, wherein:
one or more of:
the Diesel engine controller stores a maximum speed as a preselection value; and
the vehicle controller is further configured to a determine the maximum speed;
the speed interval is additionally specified with reference to the maximum speed; and
the interface is further configured to transmit the maximum speed as a third speed interval value.

4. The drive control arrangement of claim 1, wherein:
the interface is further configured such that the at least one speed interval value consists of a first speed interval value indicative of a desired speed;
the Diesel engine controller includes a processing unit configured to determine a maximum speed and a minimum speed of the speed interval using the desired speed via a first calculation rule.

5. The drive control arrangement of claim 4, wherein the vehicle controller is further configured to:
set an optimal operating speed of the operation of at least one of the consumers;
set a minimum speed of the operation of the at least one of the consumers; and
determine the first speed interval value with reference to the optimal speed, the minimum speed, and the first calculation rule.

6. The drive control arrangement of claim 4, wherein:
the Diesel engine controller includes a speed trajectory controller that receives, via at least one of the interface and the processing unit, the desired speed and at least the minimum speed;
the speed trajectory controller is configured to generate the first control signal, either indirectly or directly, so as to regulate an actual speed of the Diesel engine to the desired speed; and
the speed trajectory controller is further configured to limit a drop in the actual speed, in response to a rise in the power demand of the mechanical power, to the minimum speed.

7. The drive control arrangement of claim 6, wherein the speed trajectory controller is further configured to generate the first control signal with reference to an air mass actual value.

8. The drive control arrangement of claim 7, wherein:
the Diesel engine controller is further configured to predetermine a value of a dynamic power reserve of the Diesel engine for the speed trajectory controller;
the speed trajectory controller is further configured to modify the first control signal so as to increase the speed, in response to the available power reserve of the Diesel engine is equal to or less than the predetermined value of the dynamic power reserve; and
the vehicle controller is further configured to transmit a target value of the dynamic power reserve to the Diesel engine controller via the interface.

9. The drive control arrangement of claim 1 wherein:
the Diesel engine controller includes a processing unit configured to divide the power demand of the mechanical power into a Diesel engine power value and a stored power value; and
the drive control arrangement further comprises:
an injection rate control that is actuated with reference to the Diesel engine power value; and
a storage control that is actuated using the stored power value.

10. A data communication interface of a vehicle controller of a hydraulic working machine, the data communication interface configured to:
communicate with an interface of a Diesel engine controller; and
transmit a power demand including a mechanical power value and at least one speed interval value indicative of a speed interval,
wherein the data communication interface is further configured such that a first speed value is indicative of a desired speed, and such that a second speed value is indicative of a minimum speed.

11. The data communication interface of claim 10, wherein the data communication interface is further configured such that a third speed interval value is indicative of a maximum speed.

12. A data communication interface of a Diesel engine controller of a hydraulic working machine, the data communication interface configured to:
communicate with an interface of a vehicle controller; and
receive a power demand including a mechanical power value and at least one speed interval value indicative of a speed interval,
wherein the data communication interface is further configured such that a first speed value is indicative of a desired speed, and such that a second speed value is indicative of a minimum speed.

13. The data communication interface of claim 12, wherein the data communication interface is further configured such that a third speed interval value is indicative of a maximum speed.

\* \* \* \* \*